(12) United States Patent
Han et al.

(10) Patent No.: US 9,933,933 B2
(45) Date of Patent: Apr. 3, 2018

(54) MOBILE TERMINAL AND CONTROL METHOD THEREOF

(71) Applicant: LG ELECTRONICS INC., Seoul (KR)

(72) Inventors: Kiseok Han, Seoul (KR); Kyoungchul Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 790 days.

(21) Appl. No.: 14/488,051

(22) Filed: Sep. 16, 2014

(65) Prior Publication Data

US 2015/0082257 A1 Mar. 19, 2015

(30) Foreign Application Priority Data

Sep. 17, 2013 (KR) .................. 10-2013-0112040

(51) Int. Cl.
*G06F 3/048* (2013.01)
*G06F 3/0488* (2013.01)
*G06F 3/01* (2006.01)
*G06F 3/0482* (2013.01)

(52) U.S. Cl.
CPC ............ *G06F 3/0488* (2013.01); *G06F 3/013* (2013.01); *G06F 3/0482* (2013.01)

(58) Field of Classification Search
CPC ....... G06F 3/0488; G06F 3/013; G06F 3/0482
USPC ....................................... 715/863
See application file for complete search history.

(56) References Cited

U.S. PATENT DOCUMENTS

| | | | | |
|---|---|---|---|---|
| 8,527,892 | B2 * | 9/2013 | Sirpal | G06F 1/1616 |
| | | | | 715/702 |
| 8,952,912 | B1 * | 2/2015 | Hock | G06F 3/0483 |
| | | | | 345/173 |
| 9,075,558 | B2 * | 7/2015 | Reeves | G06F 3/1438 |
| 9,268,424 | B2 * | 2/2016 | Hatanaka | G06F 3/041 |
| 9,411,505 | B2 * | 8/2016 | SanGiovanni | G06F 3/04883 |
| 9,542,096 | B2 * | 1/2017 | Hatanaka | G06F 3/041 |
| 9,645,651 | B2 * | 5/2017 | Hwang | G06F 3/017 |
| 2011/0080359 | A1 * | 4/2011 | Jang | G06F 1/1643 |
| | | | | 345/173 |
| 2012/0017147 | A1 * | 1/2012 | Mark | G06F 1/1639 |
| | | | | 715/702 |
| 2012/0030635 | A1 * | 2/2012 | Miyazaki | G06F 3/0482 |
| | | | | 715/863 |
| 2012/0124527 | A1 * | 5/2012 | Fujii | G06F 3/0233 |
| | | | | 715/863 |
| 2012/0216154 | A1 * | 8/2012 | Li | G06F 3/0482 |
| | | | | 715/863 |
| 2012/0229510 | A1 * | 9/2012 | Hayashi | A63F 13/44 |
| | | | | 345/633 |
| 2012/0254793 | A1 * | 10/2012 | Briand | G06F 3/048 |
| | | | | 715/800 |

(Continued)

*Primary Examiner* — David Phantana Angkool
(74) *Attorney, Agent, or Firm* — Birch, Stewart, Kolasch & Birch, LLP

(57) ABSTRACT

A mobile terminal including a wireless communication unit configured to provide wireless communication; a touch screen configured to display an execution screen; and a controller configured to receive a touch input to one end of the touch screen that continuously moves in a direction toward the other end of the touch screen, and display a control screen among any one of first and second control screens based on a point to which the touch input is applied.

18 Claims, 21 Drawing Sheets

(56) References Cited

U.S. PATENT DOCUMENTS

| | | | |
|---|---|---|---|
| 2013/0002580 A1* | 1/2013 | Sudou | G06F 3/038 345/173 |
| 2013/0222305 A1* | 8/2013 | Kanno | G06F 3/0484 345/173 |
| 2013/0290909 A1* | 10/2013 | Gray | G01C 21/00 715/854 |
| 2014/0040769 A1* | 2/2014 | Lazaridis | G06F 3/0483 715/752 |
| 2014/0184494 A1* | 7/2014 | Burachas | G06F 3/012 345/156 |
| 2015/0026647 A1* | 1/2015 | Park | G06F 3/0488 715/863 |
| 2015/0082257 A1* | 3/2015 | Han | G06F 3/0488 715/863 |
| 2015/0089419 A1* | 3/2015 | Hwang | G06F 3/017 715/768 |
| 2015/0089456 A1* | 3/2015 | Nitta | G06F 3/04883 715/863 |
| 2015/0109204 A1* | 4/2015 | Li | G06F 3/011 345/156 |
| 2017/0094156 A1* | 3/2017 | Kim | G06F 3/013 |

* cited by examiner

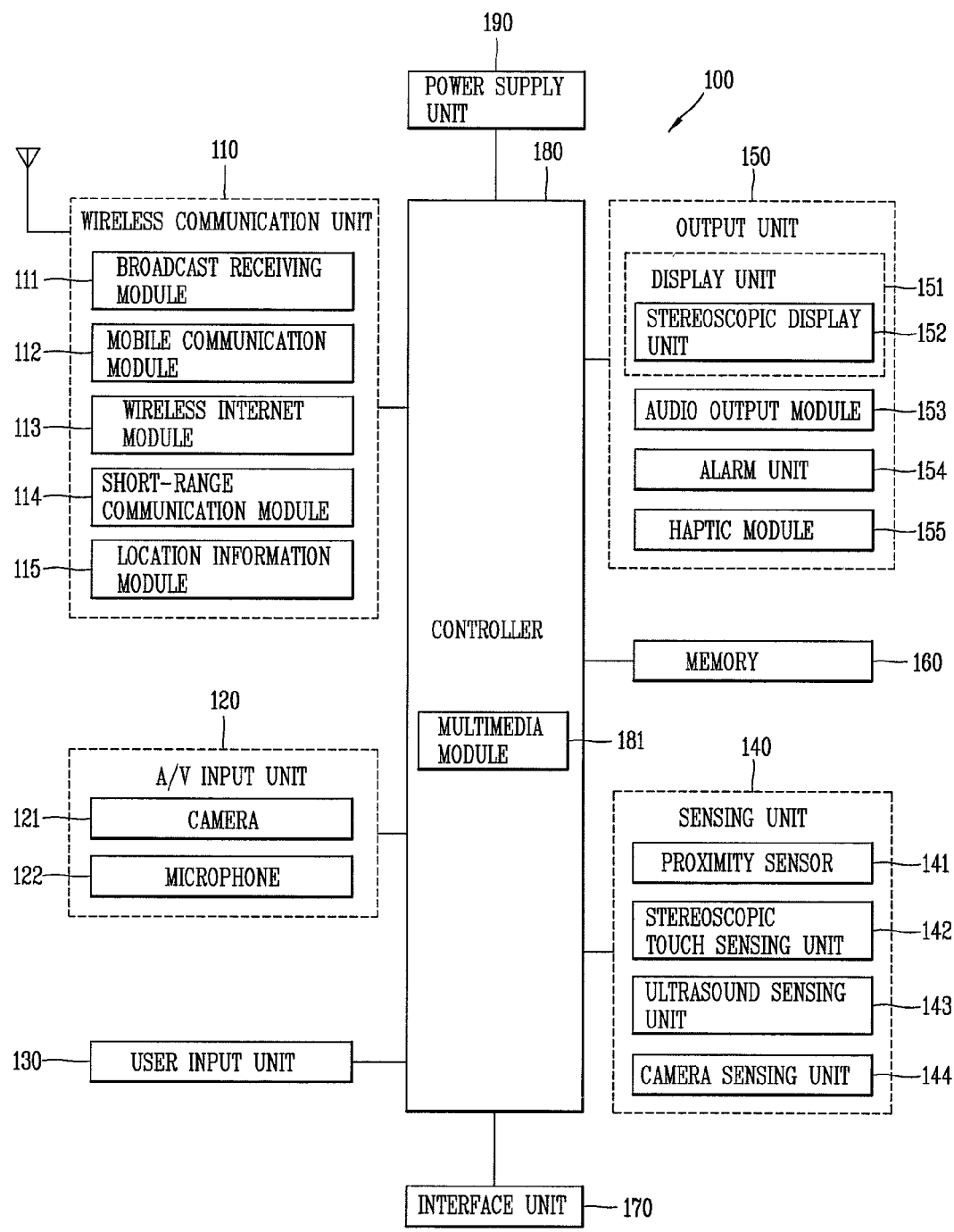

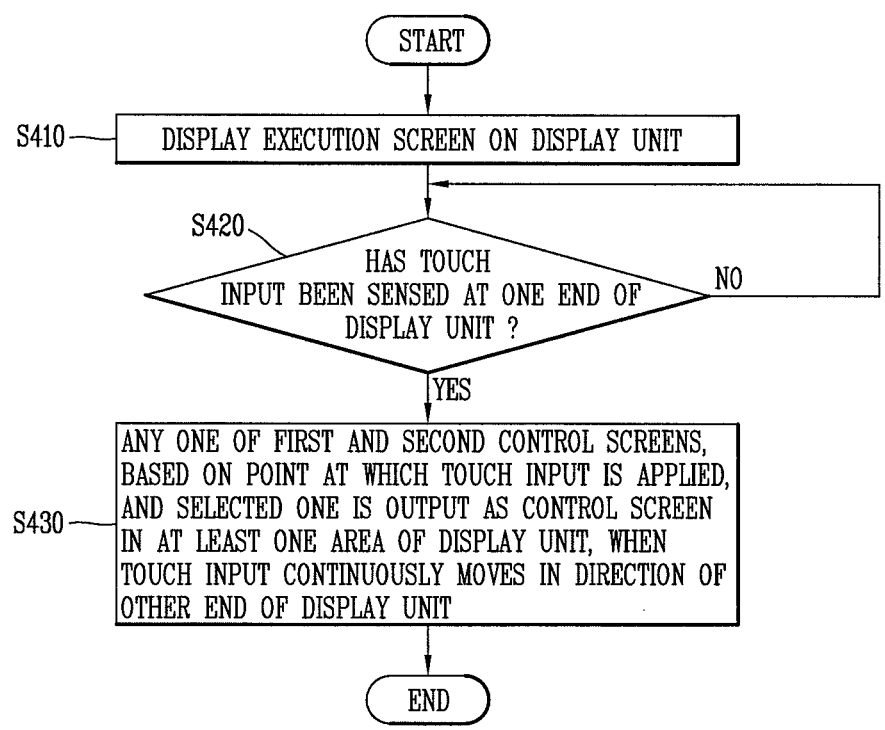

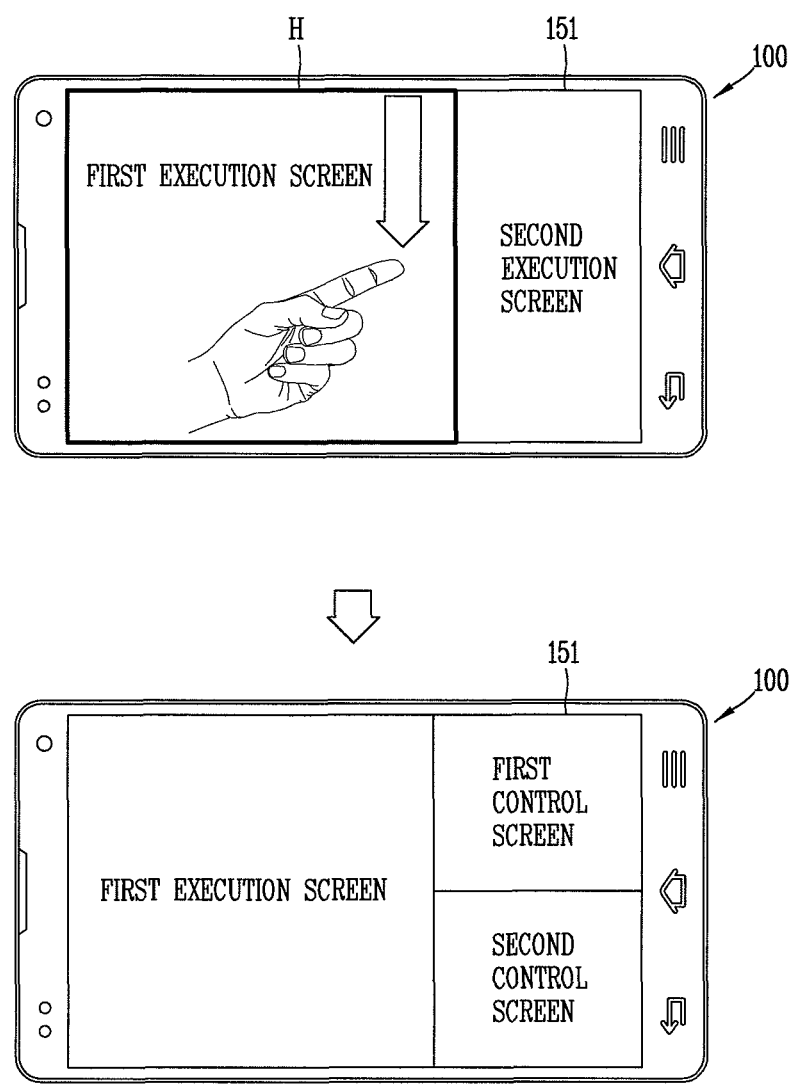

MOBILE TERMINAL AND CONTROL METHOD THEREOF

CROSS-REFERENCE TO RELATED APPLICATIONS

Pursuant to 35 U.S.C. § 119(a), this application claims the benefit of earlier filing date and right of priority to Korean Application No. 10-2013-0112040, filed on Sep. 17, 2013, the contents of which is incorporated by reference herein in its entirety.

BACKGROUND OF THE INVENTION

1. Field of the Invention

The present invention relates to a mobile terminal and a corresponding method for outputting a control screen in response to a user's touch.

2. Description of the Related Art

In general, a terminal may be classified into a mobile (portable) terminal and a stationary terminal. The mobile terminal may be also classified into a handheld terminal and a vehicle mounted terminal. The terminal can also support more complicated functions such as capturing images or video, reproducing music or video files, playing games, receiving broadcast signals, and the like. Thus, the mobile terminal may be embodied in the form of a multimedia player or a device.

However, because of the additional functions, the complexity of the user interface increases, which is often cumbersome and inconvenient for the user.

SUMMARY OF THE INVENTION

Therefore, an aspect of the present invention is to address the above-noted and other problems with the related art.

Another aspect of the present invention is to provide a mobile terminal and corresponding method of controlling the mobile terminal for outputting different control screens according to touch points.

To achieve these and other advantages and in accordance with the purpose of this specification, as embodied and broadly described herein, the present invention provides a mobile terminal including a wireless communication unit configured to provide wireless communication; and a touch screen configured to display an execution screen; a controller configured to receive a touch input to one end of the touch screen that continuously moves in a direction toward the other end of the touch screen, and display a control screen among any one of first and second control screens based on a point to which the touch input is applied.

In another aspect, the present invention provides a method of controlling a mobile terminal, and which includes displaying, via a touch screen of the mobile terminal, an execution screen; receiving, via a controller of the mobile terminal, a touch input to one end of the touch screen that continuously moves in a direction toward the other end of the touch screen; and displaying a control screen on the touch screen among any one of first and second control screens based on a point to which the touch input is applied.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings:

FIG. 1 is a block diagram illustrating a mobile terminal according to an embodiment;

FIG. 4 is a flowchart illustrating a method controlling of the mobile terminal according to an embodiment of the present invention;

FIGS. 9A, 9B, 9C, 10A, 10B and 11 are conceptual diagrams illustrating the mobile terminal outputting a control screen, based on the direction of a user's sight line, when a plurality of execution screens are output.

DETAILED DESCRIPTION OF EMBODIMENTS

Figure 2A:
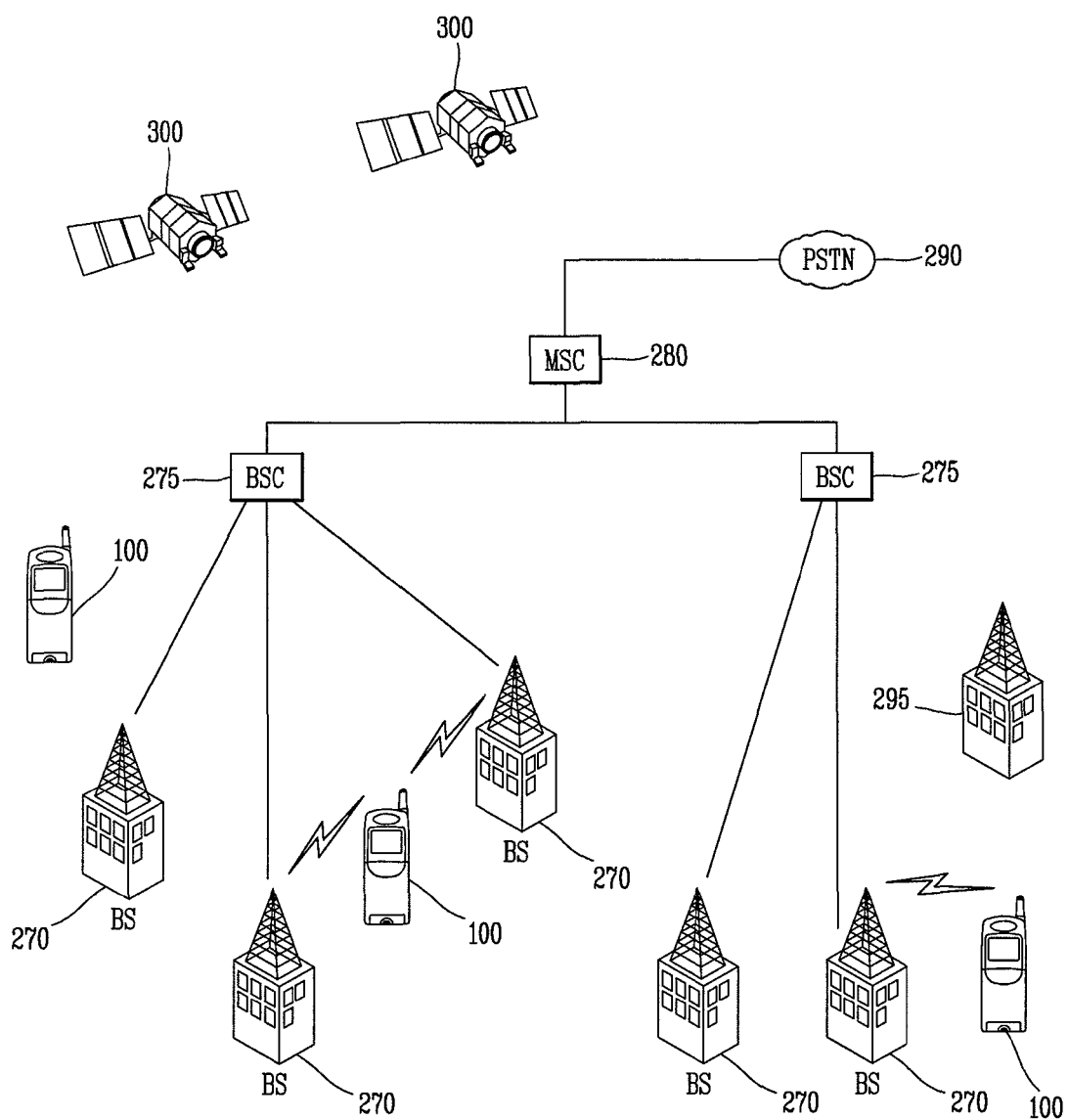
FIGS. 2A and 2B are conceptual diagrams of a communication system in which the mobile terminal can operate.

Description will now be given in detail of the embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. The accompanying drawings are used to help easily understood the technical idea of the present invention and the idea of the present invention is not limited by the accompanying drawings.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC and an ultra book. However, it will be obvious to those skilled in the art that the present invention may be also applicable to a fixed terminal such as a digital TV and a desktop computer, except for specific configurations for mobility.

FIG. 1 is a block diagram of a mobile terminal 100 in accordance with one embodiment of the present invention. As shown, the mobile terminal 100 may include components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but implementing all of the illustrated components is not a requirement. Greater or fewer components may alternatively be implemented.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, and a location information module 115.

The broadcast receiving module 111 receives a broadcast signal and/or broadcast associated information from an external broadcast managing entity via a broadcast channel. The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the display device. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external display device, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the display device. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a display device. An example of the location information module 115 may include a Global Position System (GPS) module.

Still referring to FIG. 1, the A/V input unit 120 is configured to provide audio or video signal input to the display device. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the display device.

The microphone 122 may receive an external audio signal while the display device is in a particular mode, such as a phone call mode, a recording mode, a voice recognition mode, or the like. This audio signal is processed into digital data. The processed digital data is converted for output into a format transmittable to a mobile communication base station via the mobile communication module 112 for the phone call mode. The microphone 122 may include assorted noise removing algorithms to remove noise generated in the course of receiving the external audio signal.

The user input unit 130 may generate input data input by a user to control the operation of the display device. The user input unit 130 may include a keypad, a dome switch, a touchpad (e.g., static pressure/capacitance), a jog wheel, a jog switch and the like.

The sensing unit 140 provides status measurements of various aspects of the display device. For instance, the sensing unit 140 may detect an open/close status of the display device, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type display device, the sensing unit 140 may sense whether a sliding portion of the display device is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the display device is operating in a phone call mode, the display unit 151 will provide a User Interface (UI) or a Graphic User Interface (GUI), which includes information associated with the call. As another example, if the display device is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display.' A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

The display unit 151 may also be implemented as a stereoscopic display unit 152 for displaying stereoscopic images. Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like. In general, a 3D stereoscopic includes a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

In addition, a left image and a right image required for implementing a 3D stereoscopic image is displayed on the stereoscopic display unit 152 by a stereoscopic processing unit. The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 can sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this instance, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch.' For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144. The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves. The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera 121, a photo sensor, and a laser sensor. For example, the camera 121 and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In more detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the display device may include call signal reception, message reception, key signal inputs, a touch input etc. In addition to video or audio signals, the alarm unit 154 may output signals in a different manner, for example, using vibration to inform about an occurrence of an event. The video or audio signals may be also output via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be output or sequentially output.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are input or output. In addition, the memory 160 may store data regarding various patterns of vibrations and audio signals output when a touch is input to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the display device therethrough. Various command signals or power input from the cradle may operate as signals for recognizing that the display device is properly mounted on the cradle.

The controller 180 typically controls the general operations of the display device. For example, the controller 180 performs controlling and processing associated with voice calls, data communications, video calls, and the like. The controller 180 can include a multimedia module 181 for reproducing multimedia data. The multimedia module 181 may be configured within the controller 180 or may be configured to be separated from the controller 180.

The controller 180 can perform a pattern recognition processing to recognize a handwriting input or a picture drawing input performed on the touch screen as characters or images, respectively. Also, the controller 180 can execute a lock state to restrict a user from inputting control commands for applications when a state of the display device meets a preset condition. Further, the controller 180 can control a lock screen displayed in the lock state based on a touch input sensed on the display unit 151 in the lock state of the display device.

The power supply unit 190 receives external power or internal power and supplies appropriate power required for operating respective elements and components under the control of the controller 180. Various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2B:
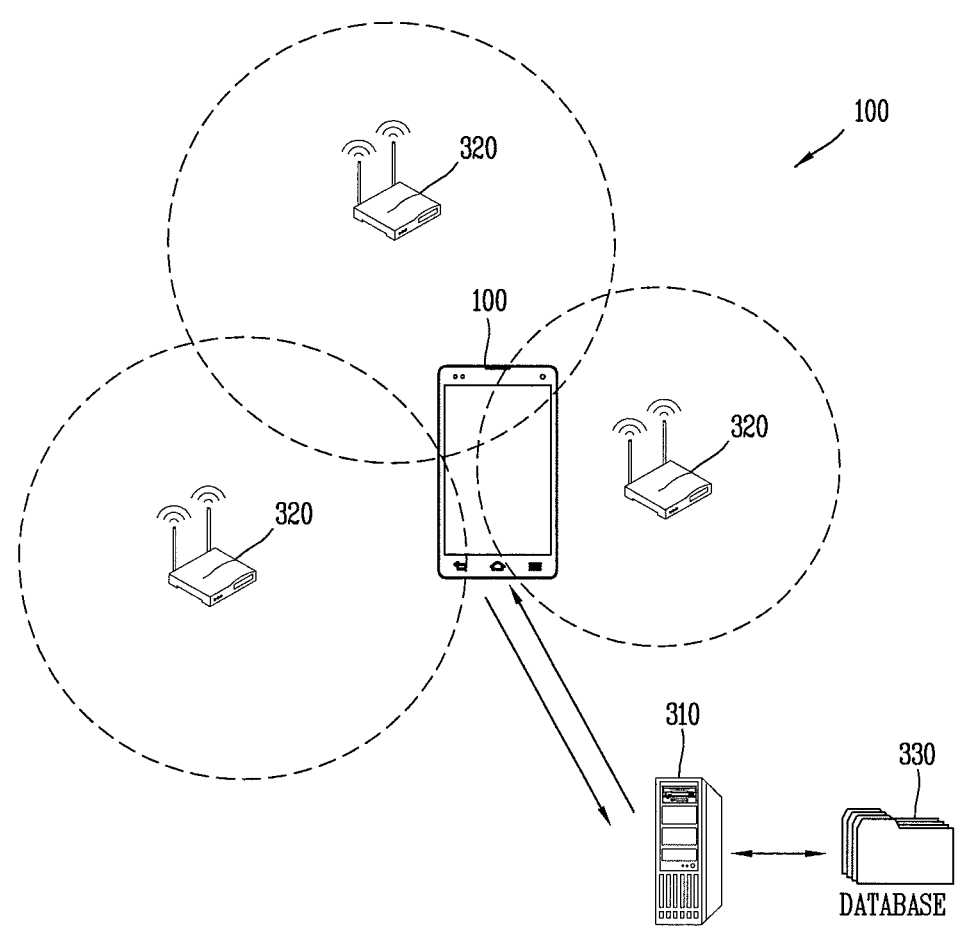

Hereinafter, a communication system which is operable with the mobile terminal 100 according to the present invention will be described. FIGS. 2A and 2B are conceptual views of a communication system operable with a mobile terminal 100 in accordance with the present invention.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like. By way of a non-limiting example only, further description will relate to a CDMA communication system, but such teachings apply equally to other system types including the CDMA wireless communication system.

Referring now to FIG. 2A, a CDMA wireless communication system is shown having a plurality of display device s 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the display device s 100 operating within the system. The broadcast receiving module 111 (FIG. 1B) is typically configured inside the mobile terminal 100 to receive broadcast signals transmitted by the BT 295.

FIG. 2A further depicts several Global Positioning System (GPS) satellites 300. Such satellites 300 facilitate locating the position of at least one of plural display device s 100. Two satellites are depicted in FIG. 2, but useful position information may be obtained with greater or fewer satellites than two satellites. The GPS module 115 (FIG. 1B) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various display device s 100. The display devices 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the display device s 100.

Hereinafter, description will be given of a method for acquiring location information of a display device using a wireless fidelity (WiFi) positioning system (WPS), with reference to FIG. 2B. The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

Further, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330. The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

Thus, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Figure 3A:
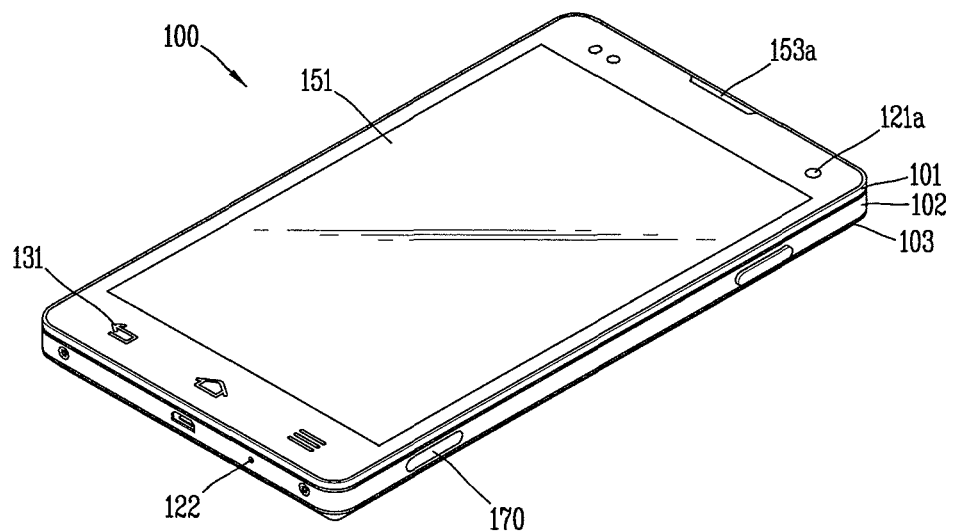
FIG. 3A is a front perspective view illustrating an example of the mobile terminal.

Hereinafter, a structure of the mobile terminal of FIG. 1 according to an embodiment of the present invention will be explained. In particular, FIG. 3A is a front perspective view illustrating an example of the mobile terminal 100 associated with the present invention.

The mobile terminal 100 disclosed herein is provided with a bar-type terminal body. However, the present invention is not limited to this, but is also applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components are incorporated into a space formed between the front case 101 and the rear case 102. At least one middle case may be additionally disposed between the front case 101 and the rear case 102, and a battery cover 103 for covering the battery 191 may be detachably configured at the rear case 102. The cases may be formed by injection-molding a synthetic resin or may be also formed of a metal, for example, stainless steel (STS), titanium (Ti), or the like.

A display unit 151, a first audio output module 153*a*, a first camera 121*a*, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing mechanism to receive a control command by a touch method. When a touch is made to any one place on the display unit 151, the touch sensing mechanism may be configured to sense this touch and enter the content corresponding to the touched place. The content entered by a touch method may be a text or numerical value, or a menu item capable of indication or designation in various modes.

The touch sensing mechanism may be formed with transparency to allow visual information displayed on the display unit 151 to be seen, and may include a structure for enhancing the visibility of a touch screen at bright places. Referring to FIG. 3A, the display unit 151 occupies a large part of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. 3B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds. It may be configured such that the sounds generated from the first audio output module 153a are released along an assembly gap between the structural bodies. In this instance, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

FIG. 3A illustrates the first manipulation unit 131 is a touch key, but the present invention is not limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being output from the first audio output module 153a, or switching into a touch recognition mode of the display unit 151. The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
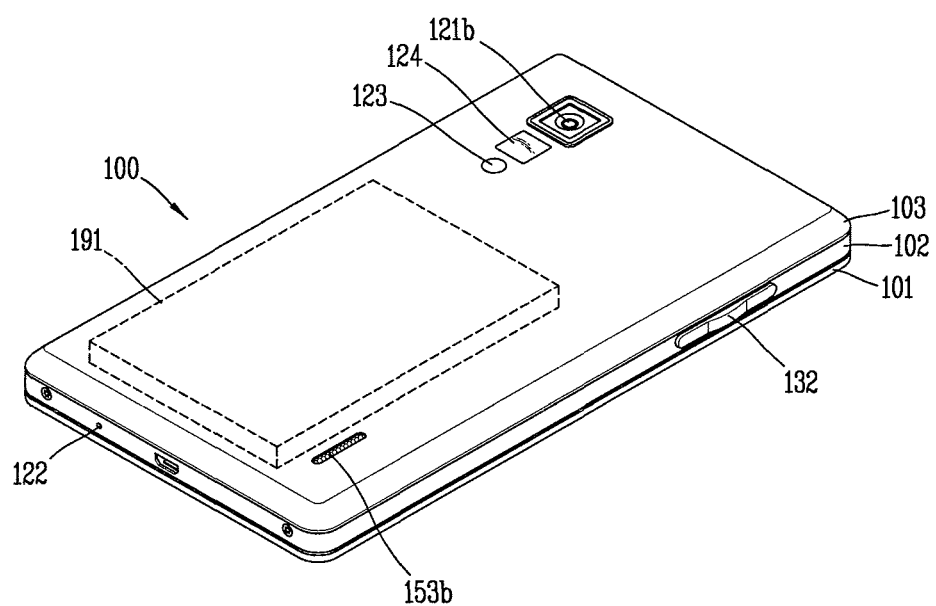
FIG. 3B is a rear perspective view of the mobile terminal shown in FIG. 3A.

Next, FIG. 3B is a rear perspective view illustrating mobile terminal 100 illustrated in FIG. 3A. Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna for receiving broadcast signals may be additionally disposed at a lateral surface of the terminal body in addition to an antenna for making a phone call or the like. The antenna constituting part of the broadcast receiving module 111 may be provided in the terminal body in a retractable manner.

A power supply unit 190 for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

Meanwhile, in the mobile terminal according to the embodiment, when a touch input applied to one end of the display unit 151 continuously moves in the direction of the other end of the display unit 151, any one of first and second control screens may be selectively output based on a point at which the touch input is applied. Therefore, in order to identify a state of the terminal or control one or more functions, a user may allow different control screens to be output using a simple gesture where a touch input is applied and then continuously moves.

Hereinafter, a mobile terminal and a control method thereof, which provides a novel user interface, based on a touch input continuously moving in the direction of from one end to the other end of the display unit 151, will be described in detail with reference to the accompanying drawings.

In particular, FIG. 4 is a flowchart illustrating an embodiment of the mobile terminal, and FIGS. 5A-6B are diagrams illustrating operation examples of the mobile terminal of FIG. 4. The mobile terminal 100 includes the display unit 151, the sensing unit 140 and the controller 180, for example.

Referring to FIG. 4, the controller 180 displays an execution screen corresponding to the execution of one or more functions on the display unit 151 according to the embodiment (S410). Here, the execution screen may be various kinds of screen information that can be displayed on the display unit 151. As an example, the screen information may be an execution screen of an application, a screen of a home screen page, a screen corresponding to a function executed by a user's request, a locking screen for preventing a malfunction caused by an unintended touch input, a screen on which moving pictures are produced, a browser, or the like.

Here, the functions executable on the terminal correspond to all kinds of functions that can be executed or driven in the mobile terminal 100. For example, one of the executable functions may be an application installed in the mobile terminal 100. In addition, that 'an arbitrary function is executed' may mean that 'an arbitrary application is executed or driven.'

As another example, the function executable in the mobile terminal may be a function of receiving an event. Here, the received event may be a message reception event, a call reception event, or the like. Meanwhile, the event may be an event that occurs in an application installed in the mobile terminal.

As still another example, the function executable in the mobile terminal may be a function required to basically drive the mobile terminal. For example, the function required to basically drive the mobile terminal may be a function of turning on/off illumination provided in the display unit 151, and include a function of converting the mobile terminal into a locking state from an unlocking state or converting the mobile terminal into the unlocking state from the locking state, a function of setting a communication network, a function of changing setting information of the mobile terminal, and the like.

When the execution screen corresponding to the execution of the one or more functions is displayed as described above, the controller 180 senses a touch input applied to one end of the display unit 151 (S420). In an embodiment, the controller 180 can divide the execution screen into an area in which an object is output and an area in which the object is not output.

In more detail, the object refers to a graphic element where if a touch input is applied in the area in which the object is output, a predetermined control function is executed. For example, an icon, menu or the like corresponds to the object. In this state, the controller 180 can compute in which area the touch input is sensed on the execution screen. The touch input may be sensed at one end of the display unit 151 in the area ('empty space') in which the object is not output.

Here, the one end of the display unit 151 may mean any one of top, bottom, right and left ends corresponding to edges of the display unit 151. Meanwhile, when the mobile terminal 100 is formed in a circular shape, i.e., a wristwatch shape, any one portion of the circumference of the display unit 151 formed in a circular shape may become the one end of the display unit 151.

In addition, if the touch input continuously moves in the direction to the other end from the end of the display unit 151 (Yes in S420), any one of first and second control screens is selected based on the point at which the touch input is applied, and the selected one of the first and second control screens is output as a control screen in at least one area of the display unit 151 (S430).

Here, the gesture where the touch input sensed at the one end of the display unit 151 continuously moves in the direction to the other end of the display unit 151 may be referred to as a flicking gesture. In addition, the gesture may be replaced by a term such as a dragging or swiping, but will be referred to as the 'flicking' gesture for consistency purposes. The point at which the touch input is sensed at the one end of the display unit 151 will be referred to as a 'touch point.'

When the touch input continuously moves in the direction to the other end at the one end of the display unit 151 (when the flicking gesture is sensed), the controller 180 displays a control screen in at least one area of the display unit 151. For example, when a touch input sensed at a top end of the display unit 151 continuously moves in the direction to a bottom end of the display unit 151, the controller 180 can decide that a gesture for outputting a control screen is sensed.

Here, the control screen may correspond to screen information including a menu for controlling an execution screen being output on the display unit 151. As an example, the control screen may be a notification panel or notification center on which the user can identify information on an event occurring in the mobile terminal 100, a quick setting panel, control center or quick panel on which the user can simply change a setting value (e.g., Wi-Fi on/off or air plane mode on/off) related to the mobile terminal 100, a control menu for controlling an application being executed, or the like. That is, the user identifies a state of the terminal or controls one or more function, through the control screen.

In addition, the control screen may include information related to an event occurring in the mobile terminal 100 or include objects (or icons) for changing settings of the mobile terminal 100. The user can change a setting value related to the mobile terminal 100 or execute functions related to control of the mobile terminal 100, using objects included in the control screen.

Further, the control screen may be changed into any one of the first and second control screens, based on at which point of the one end of the display unit 151 the touch input is initially sensed. That is, any one of the first and second control screens can be selectively output based on a touch point of the touch input sensed at the one end of the display unit 151.

Here, the first and second control screens mean control screens different from each other. That is, a control function using the first control screen is different from that using the second control screen. In addition, the first and second control screens may be changed depending on a current state of the mobile terminal, or be changed depending on a touch point of the flicking.

First, the state of the mobile terminal 100 will be described in detail. If a touch input is sensed at the one end of the display unit 151, the controller 180 can set control screens different from each other as the first and second control screens, based on a state of the mobile terminal, i.e., a function currently driven in the mobile terminal, the kind of screen information currently displayed on the display unit 151, an application corresponding to the screen information currently output on the display unit 151, a locking/unlocking state of the mobile terminal, or the like.

More specifically, although the flicking gesture is sensed at the same point, the controller 180 can output a control screen related to a "voice recognition function" in which the voice recognition function is activated (on), or output a control screen for an application related to an execution screen currently output on the display unit 151 in which the voice recognition function is non-activated (off).

Next, the touch point at the one end of the display unit 151 will be described in detail. The controller 180 can output control screens different from each other, based on a position at which the touch input is applied, and a direction in which the touch input continuously moves. In an embodiment, when the touch input is sensed at the top end of the display unit 151 and continuously moves in the direction toward the bottom end of the display unit 151, the controller 180 can output the first control screen.

On the contrary, when the touch input is sensed at the bottom end of the display unit 151 and continuously moves in the direction toward the top end of the display unit 151, the controller 180 can output the second control screen. In addition, any one of the first and second control screens may be selectively output based on at which one of left and right portions of the top end of the display unit 151 the touch input is sensed.

Figure 5A:
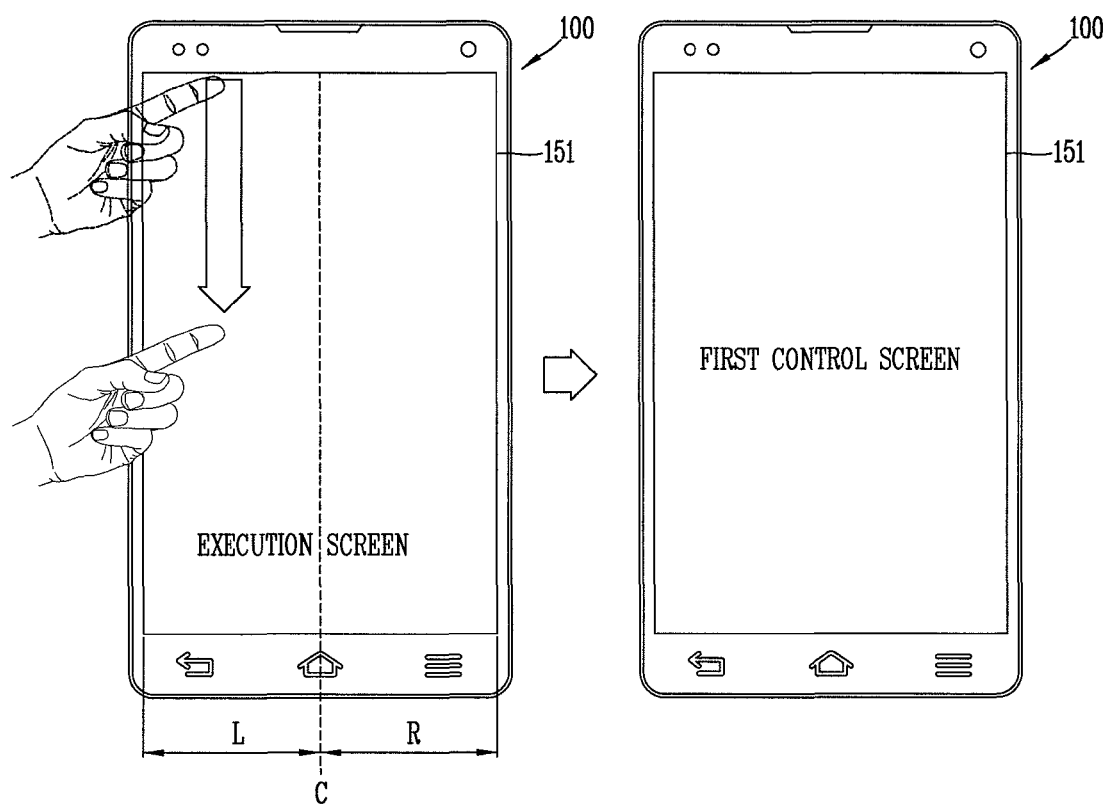
FIGS. 5A, 5B, 6A and 6B are diagrams illustrating operation examples of the mobile terminal of FIG. 4.
Figure 5B:
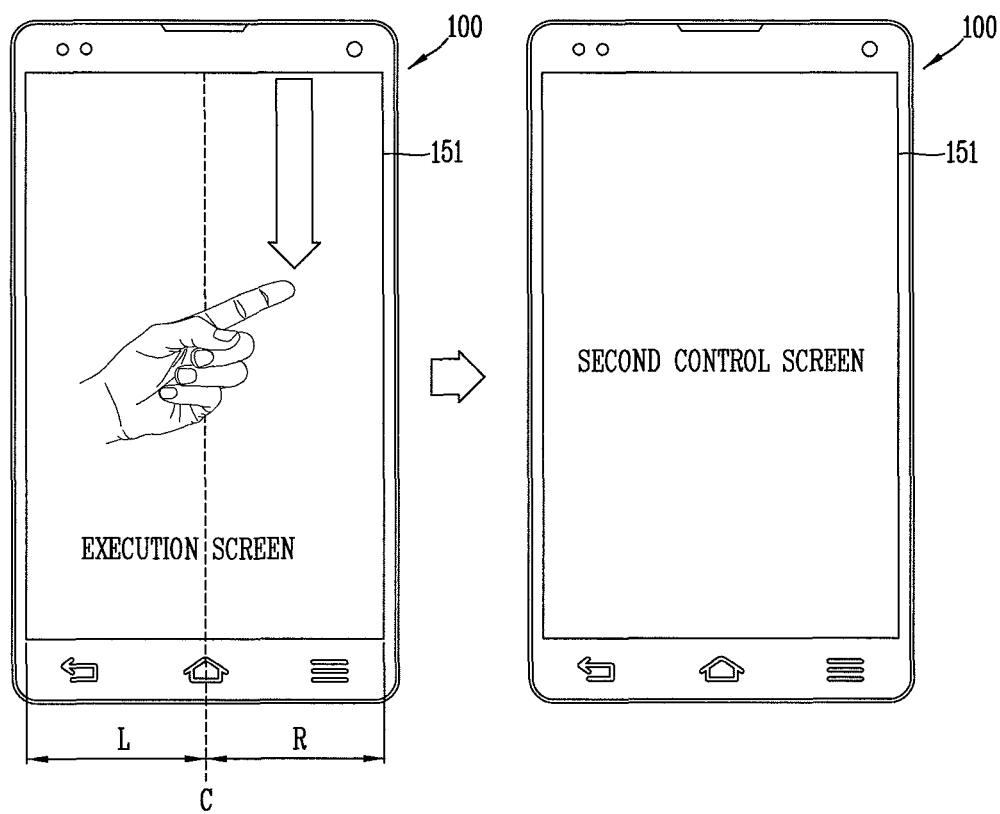

Hereinafter, a method for controlling the mobile terminal 100 according to the method described in FIG. 4 will be described in detail with reference to FIGS. 5A-6B. Referring to FIGS. 5A and 5B, the controller 180 displays an execution screen corresponding to the execution of one or more functions on the display unit 151.

In this state, when a touch input sensed at an edge of the display unit 151 continuously moves to the interior of the display unit 151, the controller 180 can output a control screen in at least one area of the display unit 151 on which the execution screen is output. In addition, the controller 180 can select the control screen as any one of the first and second screens, based on a position at which the touch input is sensed.

For example, as shown in FIGS. 5A, 5B, 6A and 6B, an area corresponding to the top end of the display unit 151 is divided into a left portion L and a right portion R, based on the center C of the top end, and any one of the first and second control screens may be selectively output based on a touch point at the one end of the display unit 151.

Figure 6A:
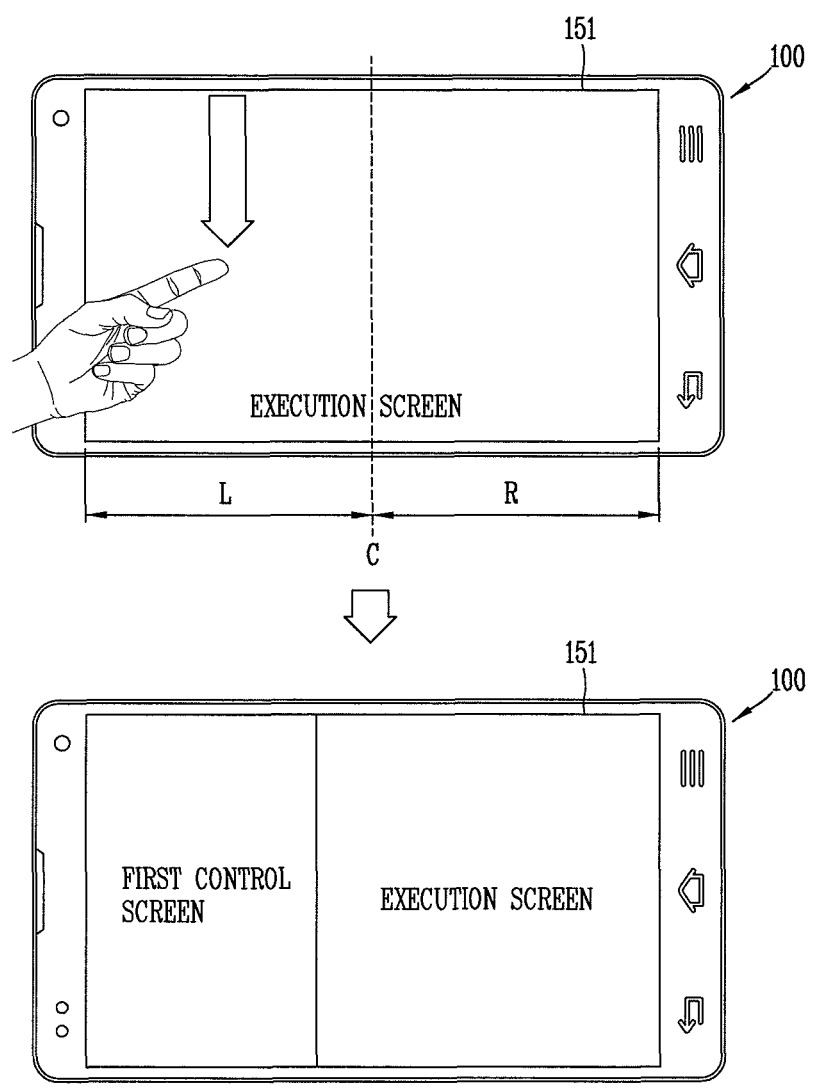
Figure 6B:
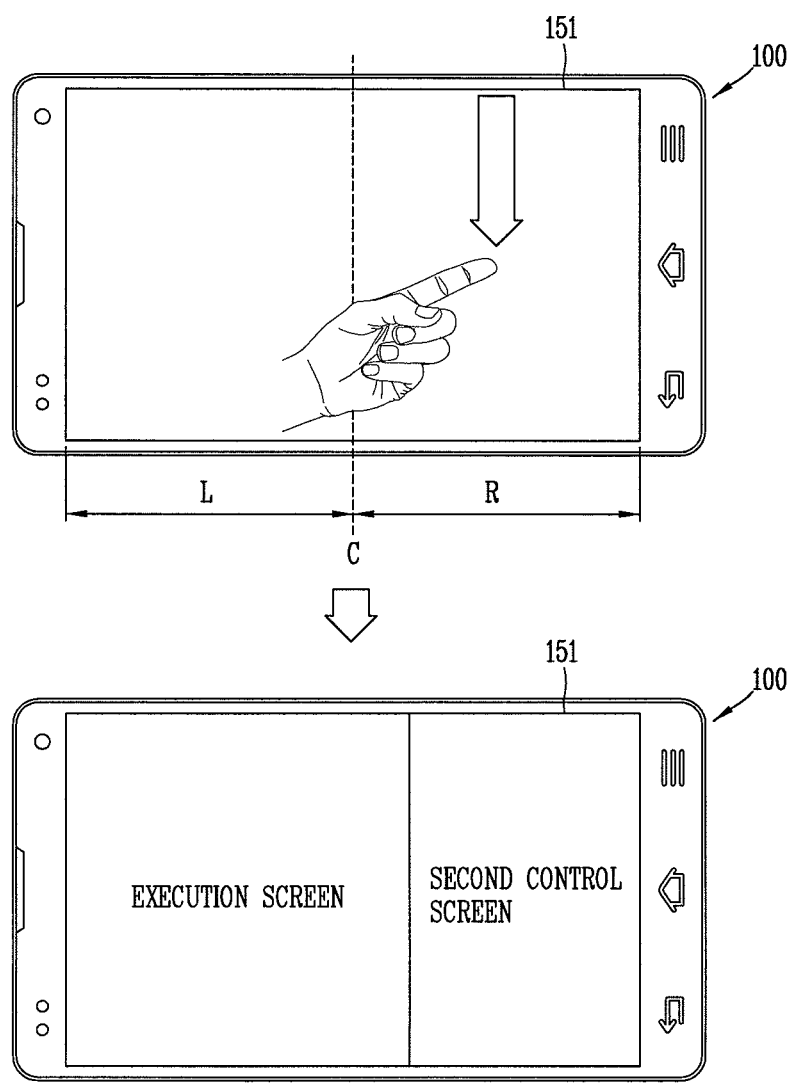

In this state, when a touch input sensed at the left portion L continuously moves in the direction toward the bottom end as shown in FIGS. 5A and 6A, the controller 180 can output the first control screen. When a touch input sensed at the right portion R continuously moves in the direction toward the bottom end as shown in FIGS. 5B and 6B, the controller 180 can output the second control screen.

In addition, any one of the first and second control screens can be output based on at which one of the top, bottom, left and right ends of the display unit 151 the touch input is sensed. In addition to the first and second control screens, a large number of control screens may be differently output based on a touch point. Hereinafter, for convenience of illustration, the mobile terminal according to the embodiment will be described based on the top end of the display unit 151.

Meanwhile, the area of the display unit 151 in which the control screen is output may be changed depending on a state of the mobile terminal 100. For example, when the mobile terminal 100 is in a portrait sate, i.e., a state in which the width of the mobile terminal 100 is shorter than the length of the mobile terminal 100 as shown in FIGS. 5A and 5B, the control screen can be output in the entire area of the display unit 151. When the mobile terminal 100 is in a landscape state, i.e., a state in which the length of the mobile terminal 100 is longer than the length of the mobile terminal 100 as shown in FIGS. 6A and 6B, the control screen can be output in one area of the display unit 151.

Further, when the control screen is output in one area of the display unit 151, the controller 180 can divide the display unit 151 into first and second areas, and output the control screen and the execution screen in the respective first and second areas. In this state, the position at which the control screen is output may be changed depending on a touch point, and the first area in which the control screen is output may include a point at which the touch input is sensed at the one end of the display unit 151.

For example, when the touch input sensed at the left portion L continuously moves in the direction toward the bottom end as shown in FIG. 6A, the first control screen is output as the control screen, and may be output in a left area of the display unit 151. When the touch input sensed at the right portion R continuously moves in the direction toward the bottom end as shown in FIG. 6B, the second control screen is output as the control screen, and may be output in a right area of the display unit 151.

As such, in the mobile terminal according to the embodiment, different screens can be output based on touch points applied to different positions of the display unit 151. The different positions may be positions that the user can generally and conceptually detect. Accordingly, the controller 180 can provide various control screens using a simple gesture and provide the user with more familiar user experience (UX). In addition, as the control screen is output, the area of the display unit 151, in which the execution screen is output, may be changed.

Figure 7A:
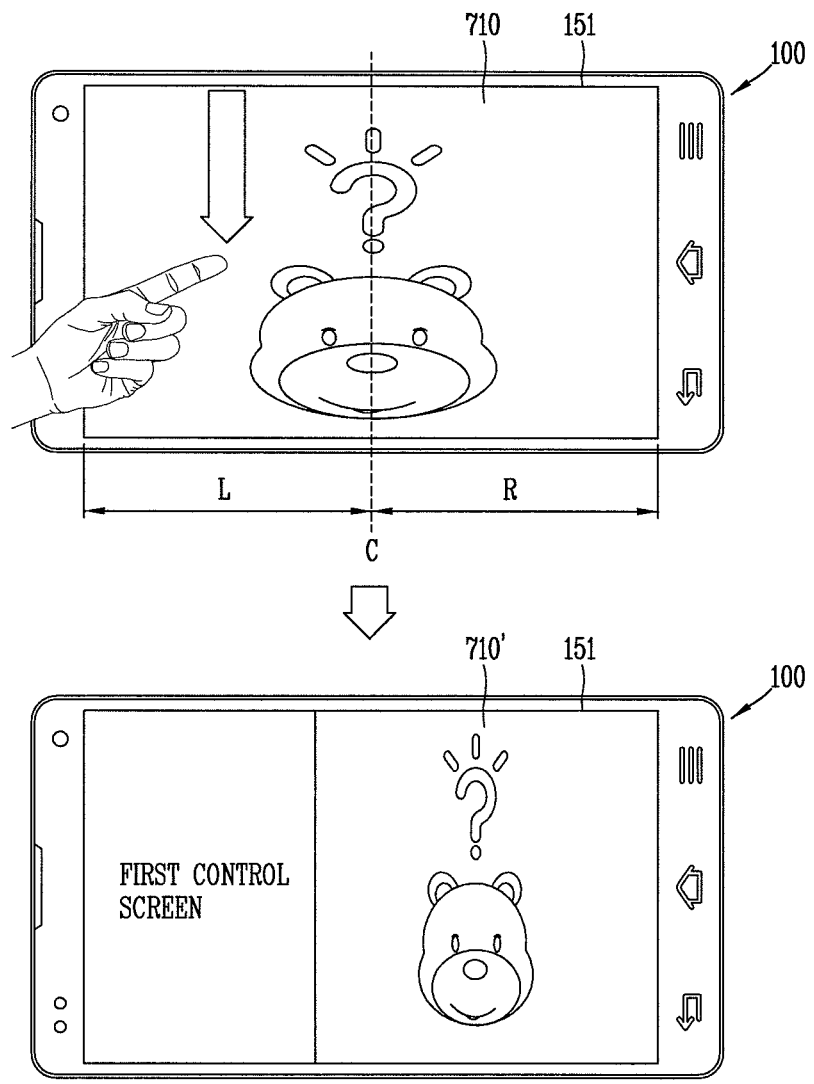
FIGS. 7A and 7B are conceptual diagrams illustrating operation examples of outputting a control screen and an execution screen in the mobile terminal according to an embodiment.
Figure 7B:
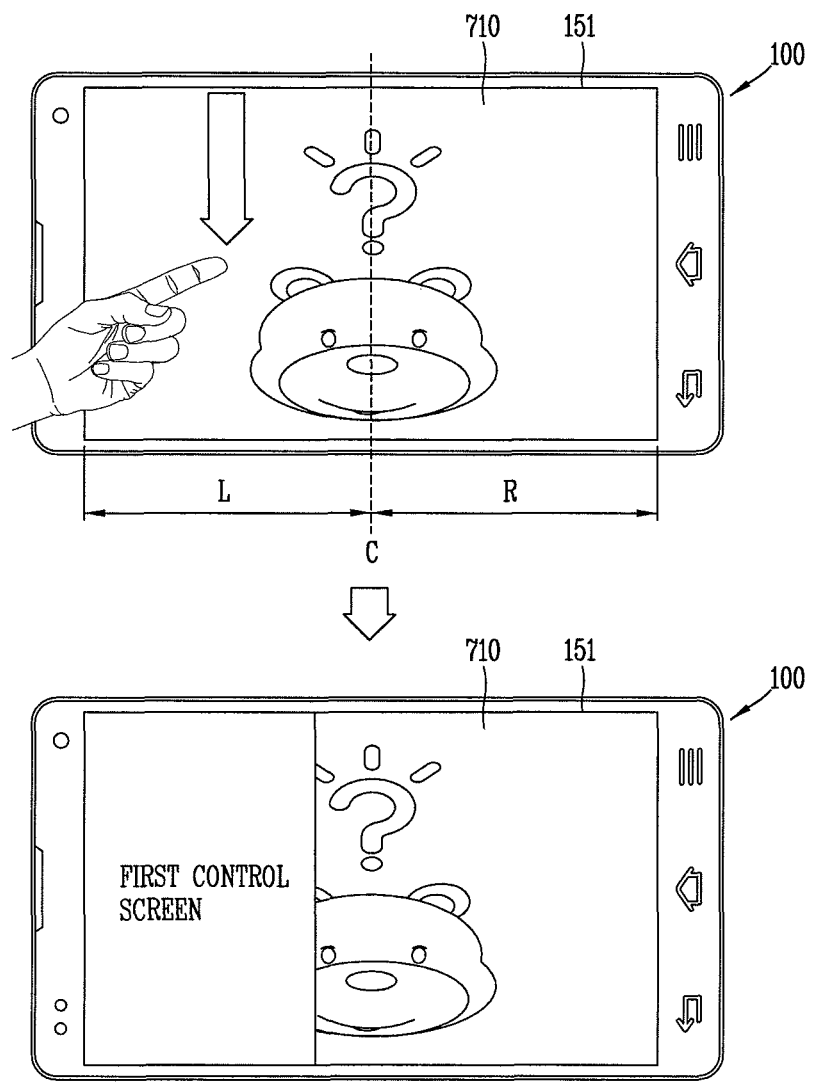

Hereinafter, a method for simultaneously outputting a control screen and an execution screen will be described in detail with reference to the accompanying drawings. FIGS. 7A and 7B are conceptual diagrams illustrating operation examples of outputting a control screen and an execution screen in the mobile terminal according to an embodiment.

Referring to FIGS. 7A and 7B, an execution screen 710 corresponding to the execution of one or more functions can be output on the display unit 151. In this state, when a touch input sensed at one end of the display unit 151 continuously moves in the direction toward the other end of the display unit 151 (i.e., when the touch input is flicked), any one of the first and second control screens may be selectively output based on a touch point at the one end.

Further, the controller 180 can display the control screen in a least one area of the display unit 151. In this instance, the controller 180 can divide the display unit 151 into first and second areas, and display the control screen and the execution screen 710 in the respective first and second areas.

Further, the controller 180 can resize contents included in the control screen, based on the size of the first area. Here, the contents are all objects that can be displayed on the display unit 151, and include information displayed using images, characters and the like.

The controller 180 can adjust the contents included in the control screen to the screen ratio of the first area, or adjust the size of the contents (e.g., the size of characters or images) according to the size of the first area. For example, when a flicking gesture is sensed at the left portion L of the top end of the display unit 151 as shown in FIG. 7A, the first control screen of the first and second control screens is output as a control screen, and the size of contents included in the execution screen 710 before the control screen is output are changed (710') as the control screen is output.

In addition, the controller 180 can output the control screen in a form such as a pop-up window on the execution screen in which the entire area of the display unit 151 is output. For example, if a flicking gesture is sensed at the left portion L of the top end of the display unit 151 as shown in FIG. 7B, the first control screen of the first and second control screens is output as a control screen, and the size of the contents output on the execution screen 710 before the control screen is output may be maintained as it is.

In addition, when the execution screen and the control screen are simultaneously output on the display unit 151, the user can continuously use functions included in not only the control screen but also the execution screen. That is, multitasking on the control screen and the execution screen can be performed. For example, when the control screen is output in which a moving picture is reproduced on the display unit 151, the size of the moving picture may be adjusted, but the controller 180 can continuously reproduce the moving picture.

As such, in the mobile terminal 100 according to the embodiment, an execution screen and a control screen can be simultaneously output, and multitasking on functions included in the execution screen and the control screen can be performed. Accordingly, the user can easily access the control screen for controlling the mobile terminal 100 while using the functions included in the execution screen.

Figure 8A:
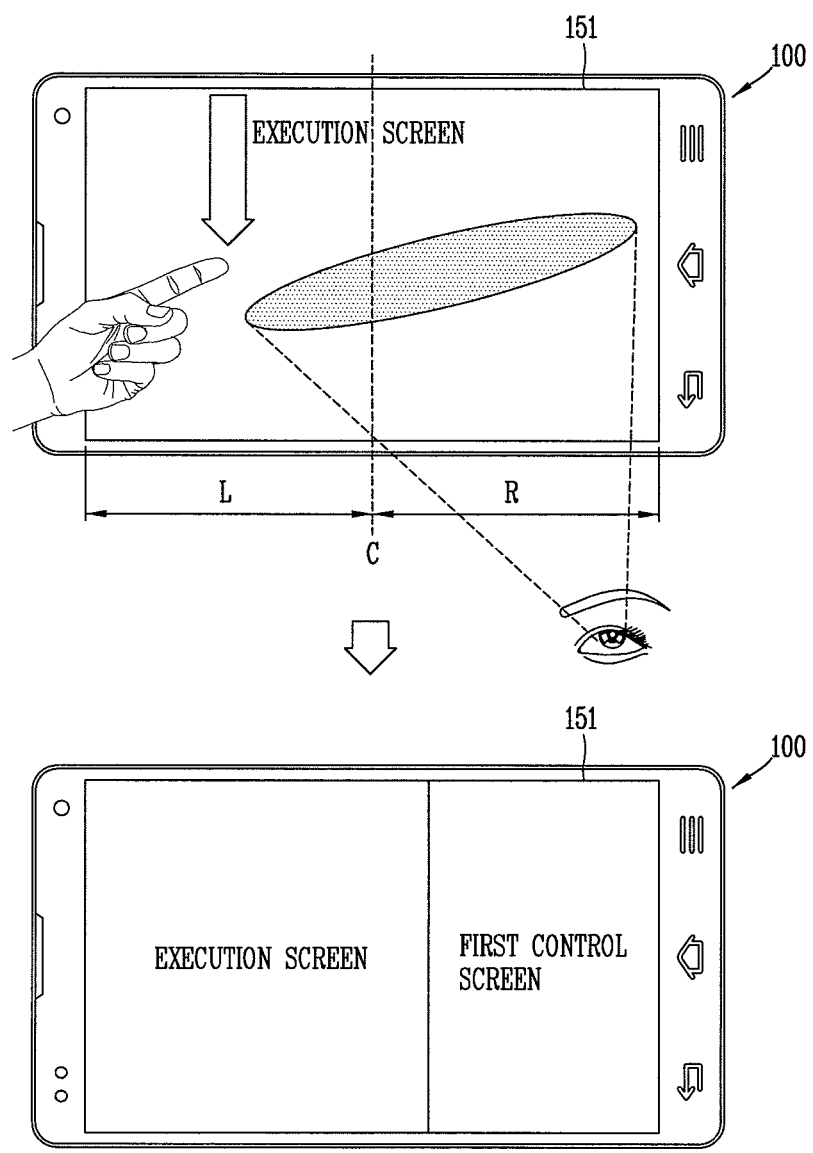
FIGS. 8A and 8B are conceptual diagrams illustrating operation examples of outputting a control screen, based on the direction of a user's sight line in the mobile terminal according to an embodiment.
Figure 8B:
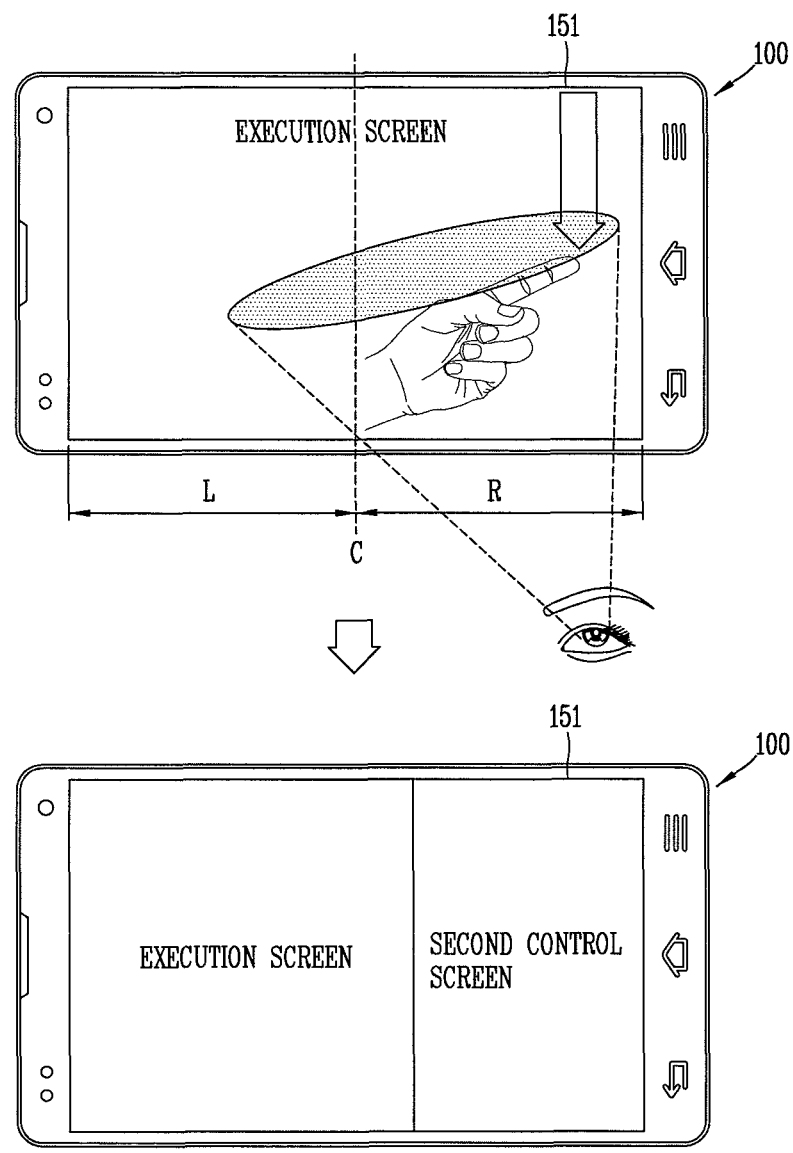

Further, the controller 180 can perform eye tracking, using an image captured in the camera 121, and determine an output position of the control screen, based on the direction of a user's sight line. Hereinafter, the mobile terminal 100 determining an output position of a control screen, based on a user's sight line, will be described in detail with reference to the accompanying drawings. In particular, FIGS. 8A and 8B are conceptual diagrams illustrating operation examples of outputting a control screen, based on the direction of a user's sight line in the mobile terminal according to an embodiment.

The controller 180 can photograph an image using the camera 121 formed in the front of the main body, and track the direction of a user's sight line using the photographed image. Various eye tracking algorithms for tracking the direction of the user's sight line may be implemented.

In this state, the controller 180 can determine an output position of a control screen, based on the direction of the user's sight line. For example, if a flicking gesture is sensed at the left portion L of the top end of the display unit 151 as shown in FIG. 8A, the controller 180 can output the first control screen. When the direction of the user's sight line is positioned in a right area of the display unit 151, the first control screen can be output in the right area of the display unit 151.

If a flicking gesture is sensed at the right side R, the second control screen can be output. In addition, if a flicking gesture is sensed at the right portion R of the top end of the display unit 151 as shown in FIG. 8B, the controller 180 can output the second control screen in the area where the direction of a user's sight line is positioned. Further, the direction of the user's sight line may be positioned in a top area, a bottom area, a left area, or the like. In this instance, the controller 180 can output the control screen in an area including at least one of the top, bottom, right and left areas of the display unit 151, based on the position of the direction of the user's sight line.

As such, in the mobile terminal 100 according to the embodiment, a control screen is newly output in an area where the direction of a user's sight line is positioned, and hence the user can use the newly output control screen without moving their user's sight line. Accordingly, their convenience can be improved. Meanwhile, a flicking gesture may be sensed in which a plurality of execution screens are output. Hereinafter, the execution screen including first and second execution screens will be described as an embodiment.

In particular, FIGS. 9A-11 are conceptual diagrams illustrating the mobile terminal outputting a control screen, based on the direction of a user's sight line, in which a plurality of execution screens are output. The controller 180 can output first and second execution screens on the display unit 151 as one or more functions are performed. For example, a screen of a home screen page may be output as the first execution screen, and an execution screen of an application related to E-mail may be output as the second execution screen.

Figure 9A:
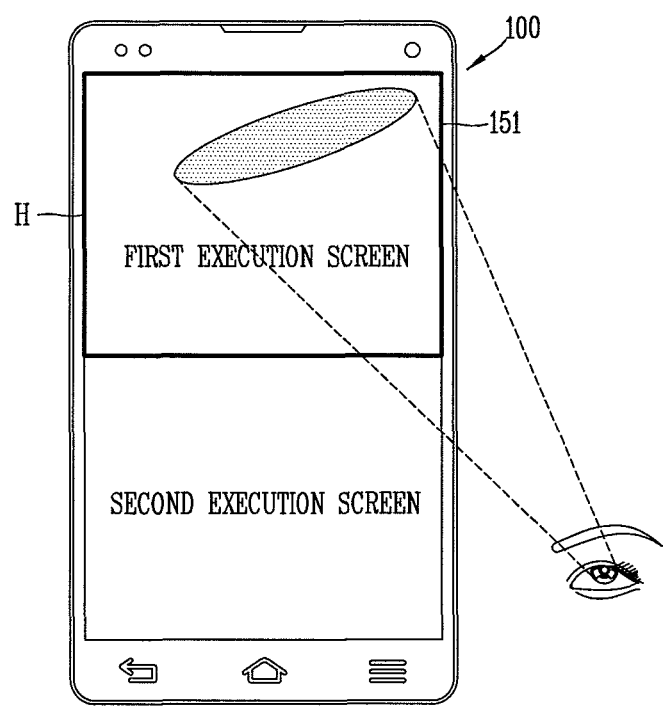

In this state, the controller 180 can track the direction of a user's sight line using an image captured in the camera 121, and identify which area of the display unit 151 the user views. That is, the controller 180 can compute the direction of the user's sight line. Further, the controller 180 can identify which execution screen is output in the direction of the user's sight line. For example, as shown in FIG. 9A, the user is viewing the first execution screen.

The controller 180 can also compute how long (e.g., a reference time) the user is looking at the first or second execution screens to determine which execution screen the user mainly views with interest. Here, the reference time may be variously changed depending on embodiments.

In addition, the controller 180 can emphasize any one of the first and second execution screens output on the display unit 151, which is positioned in the direction of the user's sight line. For example, as shown in FIG. 9A, the controller 180 can display a highlight image H at the frame of the first execution screen positioned in the direction of the user's sight line. The highlight image H may be displayed in various manners according to embodiments.

Hereinafter, a method for outputting a control screen using the embodiment in which a highlight image H is displayed, so that an execution screen positioned in the direction of a user's sight line is emphasized compared to an execution screen not positioned in the direction of the user's sight line will be described in detail. The highlight image H is used to distinguish the execution screen positioned in the direction of the user's sight line from the execution screen not positioned in the direction of the user's sight line. The highlight image H (e.g., bold borders) may not be output on the display unit 151.

Meanwhile, when a flicking gesture is sensed in which the first and second execution screens are displayed on the display unit 151, the controller 180 can selectively output any one of the first and second control screens, based on a touch point. In this state, when the flicking gesture is sensed, the controller 180 can identify one of the first and second execution screens, positioned in the direction of the user's sight line. The controller 180 can select one of the first and second execution screens, which is to be output on the display unit 151, based on the direction of the user's sight line.

That is, when the flicking gesture is sensed, the controller 180 can output, on the display unit 151, any one of the first and second execution screens, positioned in the direction of the user's sight line, and a control screen. Alternatively, an execution screen not positioned in the direction of the user's sight line may be converted into the control screen.

Figure 9B:
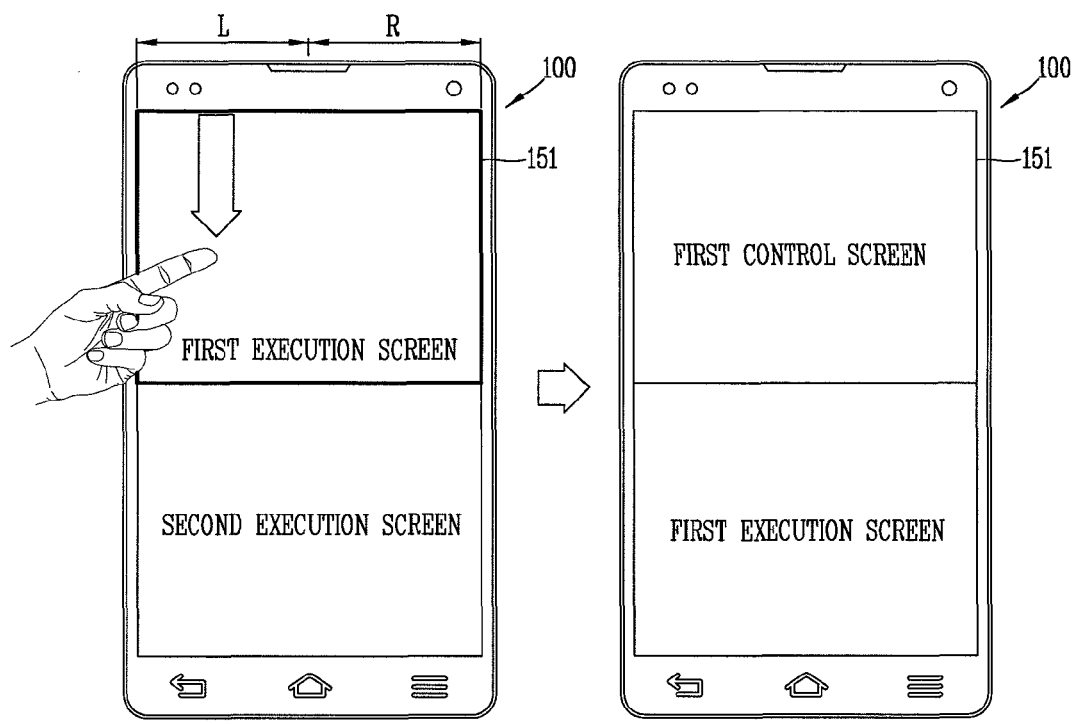
Figure 9C:
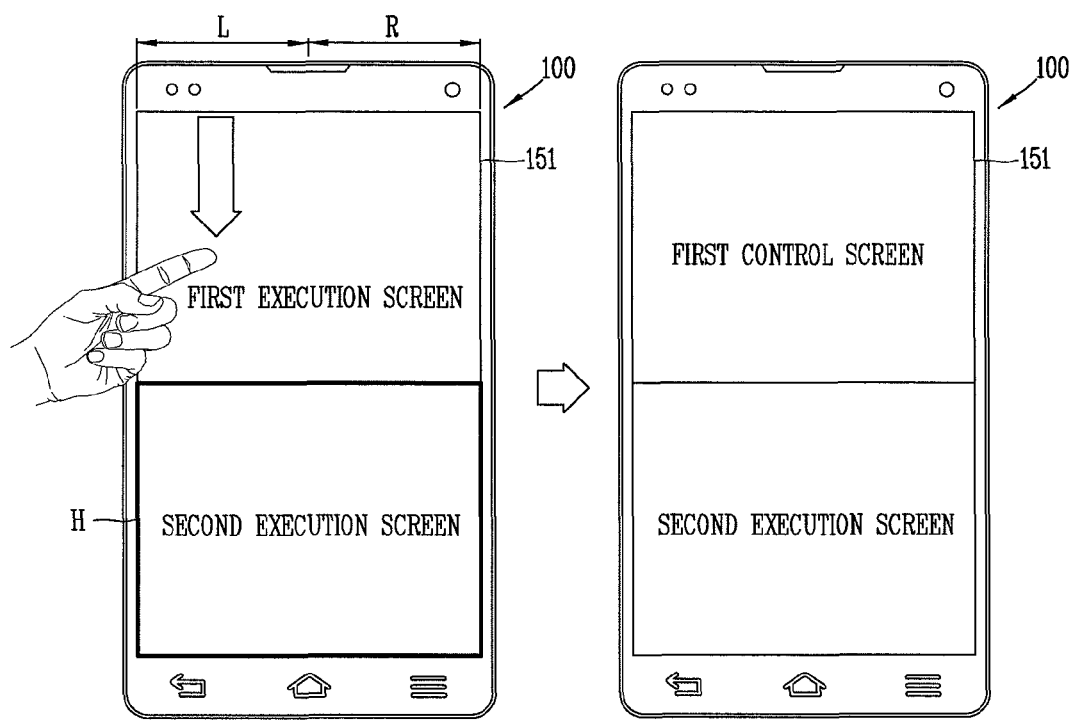

For example, as a flicking gesture is sensed at the left portion L of the top end of the display unit 151 as shown in FIG. 9B, the first control screen of the first and second control screens may be output. In this state, the user has viewed the first control screen of the first and second control screens, and therefore, the controller 180 can output the first execution screen and the first control screen on the display unit 151. Alternatively, as the user has viewed the second execution screen of the first and second execution screens as shown in FIG. 9C, and therefore, the controller 180 can output the second execution screen and the first control screen on the display unit 151.

In this state, the user can determine an output position of the control screen, based on at least one of a touch point at the one end of the display unit 151 and the direction of a user's sight line. For example, the controller 180 can output the first control screen in an area where the user's sight line is positioned as shown in FIG. 9B, or output the first control screen in an area including the touch point of the one end of the display unit 151 as shown in FIG. 9C.

Figure 10A:
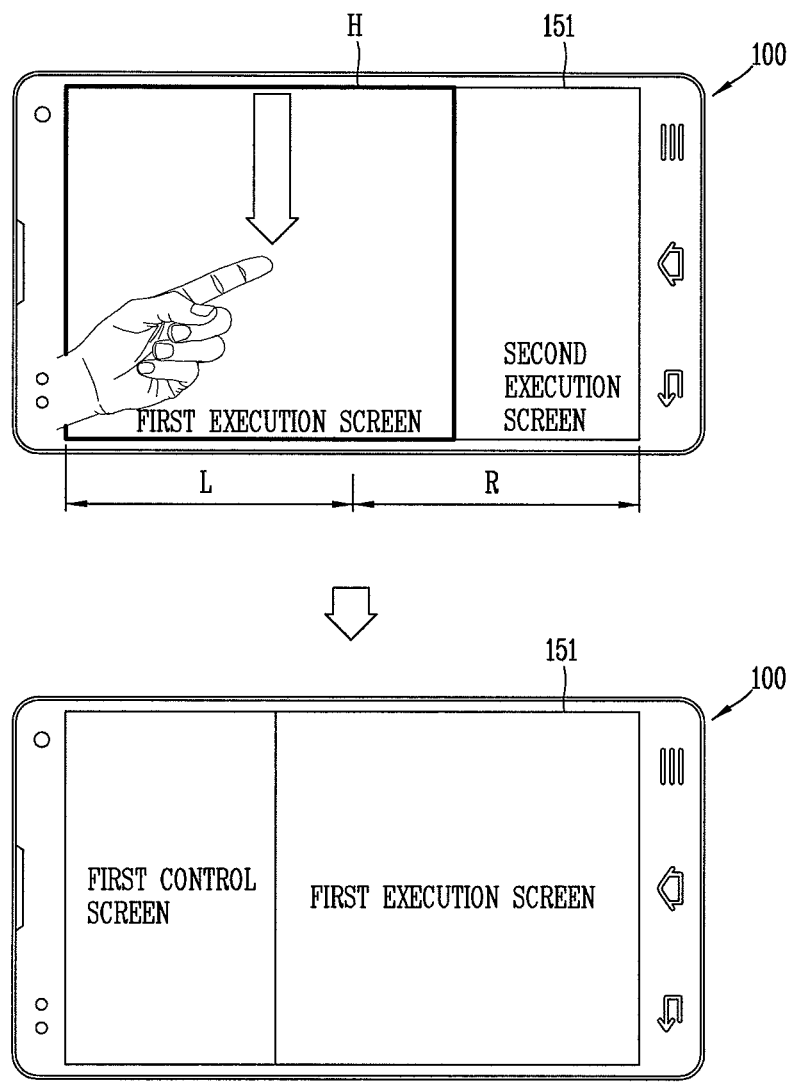
Figure 10B:
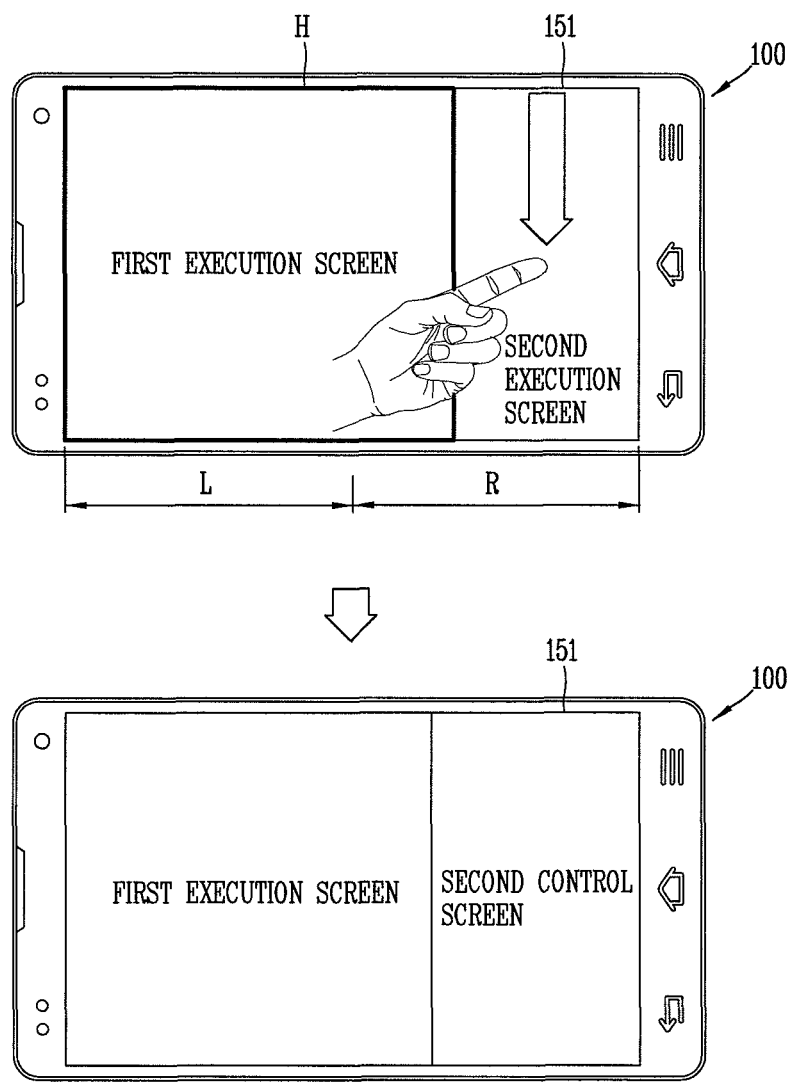

In an embodiment, when a flicking gesture is sensed as shown in FIGS. 10A and 10B, the first execution screen of the first and second execution screens, positioned in the direction of a user's sight line, may be output together with the control screen. In this state, any one of the first and second control screens may be selectively output as the control screen, based on a touch point of the one end of the display unit 151.

Meanwhile, if a flicking gesture is sensed in which the first and second execution screens are output in the mobile terminal 100 as shown in FIG. 11, the controller 180 can simultaneously output the first execution screen of the first and second execution screens, positioned in the direction of a user's sight line, and the first and second control screens. This is to control the user to continuously use an execution screen that the user has viewed in which a plurality of execution screens are output.

Meanwhile, if a touch input is applied to the one end of the display unit 151, the controller 180 can output guidance information related to control screens to be output on the display unit 151. Hereinafter, a method for outputting guidance information will be described in detail.

Figure 12A:
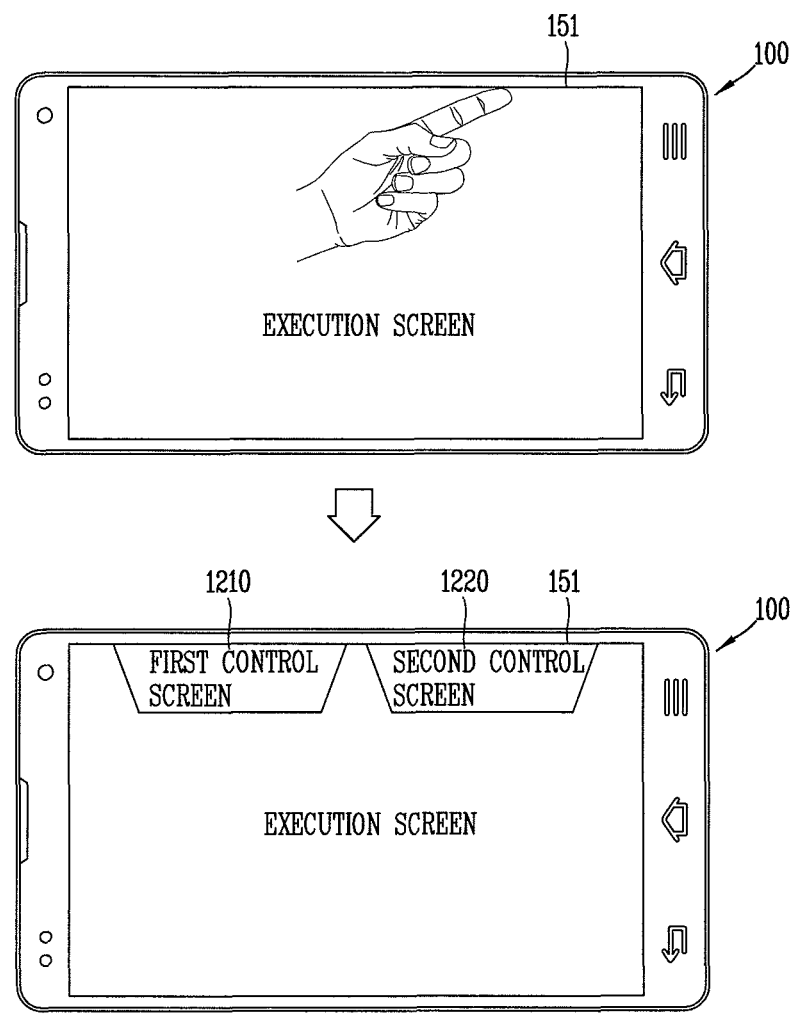
FIGS. 12A and 12B are conceptual diagrams operation examples of outputting guidance information related to a control screen in the mobile terminal according to an embodiment.
Figure 12B:
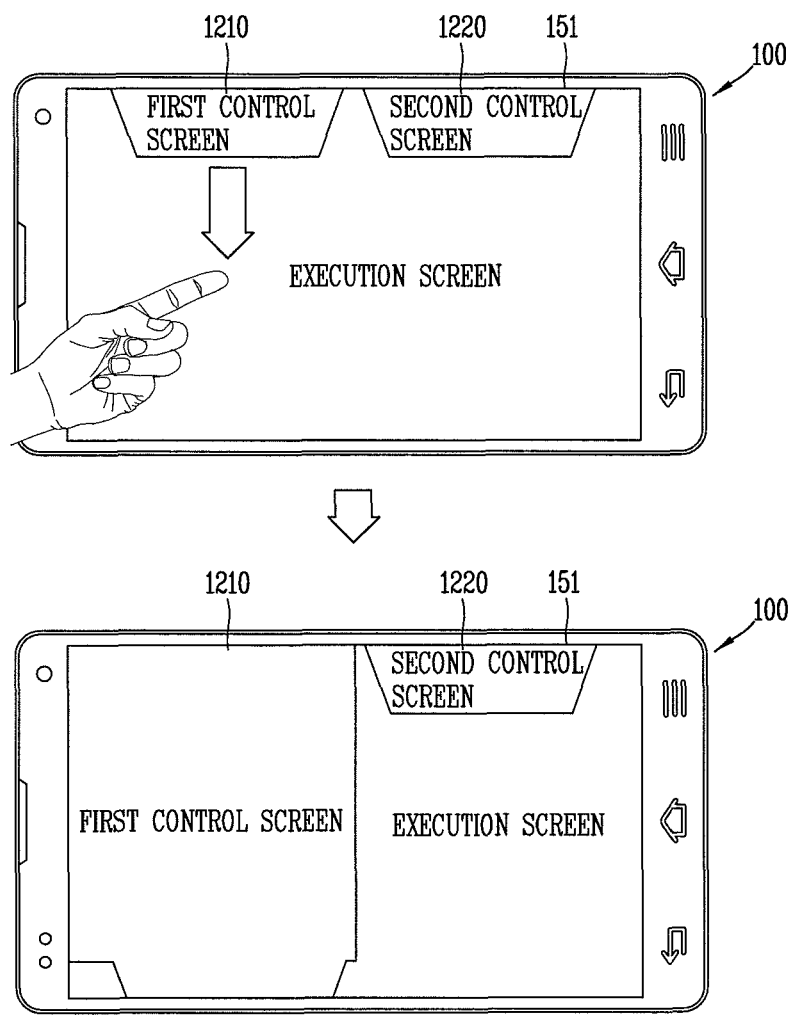

Next, FIGS. 12A and 12B are conceptual diagrams operation examples of outputting guidance information related to a control screen in the mobile terminal according to an embodiment. Referring to FIG. 12A, if a touch input is sensed at one end of the display unit 151, the controller 180 can output guidance information 1210 and 1220 on control screens to be output through a flicking gesture.

The guidance information may include information on a portion (e.g., a left/right portion) formed to output different control screens at the one end of the display unit 151, the name of a control screen to be output when the flicking gesture is performed at a specific portion, information on the control screen, and the like. In this state, if the flicking gesture is not sensed within a predetermined time, the guidance information may disappear on the display unit 151. Accordingly, the user can identify which control screen can be output using the guidance information.

Meanwhile, referring to FIG. 12B, the user may flick the guidance information in the direction of the other end from the one end of the display unit 151, at which the guidance information is positioned. In this state, the controller 180 can output a control screen corresponding to the guidance information on the display unit 151, in response to the flicking.

In addition, when a touch input sensed at the one end of the display unit 151 continuously moves from a first point to a second point, the controller 180 can change a display area of the control screen, based on movement of the touch input. For example, when a touch input continuously moves downward from one point of the top end of the display unit 151, the display area of the control screen from the top end of the display unit 151 to the position at which the touch input is ended may be magnified. That is, an animation effect can be provided as if the control screen was pulled from the top end of the display unit 151.

On the contrary, when a touch is input at one point of the display area in which a control screen is output, and continuously moves in the direction of the top end of the display unit 151, an animation effect can be provided as if the control screen disappears to the top end of the display unit 151.

Further, a touch point for outputting a control screen and the touch screen corresponding to the touch point may be added/deleted/edited by the user. For example, if a flicking gesture is sensed at the left portion of the top end of the display unit 151, the setting where the first control screen is output may be changed into a setting where the first control screen is output when a flicking gesture is sensed in the direction of the top end from the bottom end of the display unit 151. Accordingly, the user can create an interface environment suitable for the user's intention.

As described above, in the mobile terminal according to embodiments of the present invention, different control screens are output at different positions, based on a touch point of flicking, the direction of a user's sight line, or a state of the mobile terminal, thereby improving the user's convenience. Since different control screens are output based on a touch point of flicking, it is possible to output no icon related to the control of an execution screen. Thus, the entire area of the display unit 151 can be used as a space for outputting contents.

The foregoing embodiments and advantages are merely and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
 a wireless communication unit configured to provide wireless communication;
 a touch screen configured to display an execution screen;
 a camera disposed in a front of a main body of the mobile terminal; and
 a controller configured to:
 receive a touch input to one end of the touch screen that continuously moves in a direction toward the other end of the touch screen,
 track a direction of a user's sight line using an image captured in the camera, and
 display a control screen among any one of first and second control screens comprising different graphic objects based on a point to which the touch input is applied, wherein a display position of the control screen is varied according to the tracked direction of the user's sight line.

2. The mobile terminal of claim 1, wherein the controller is further configured to:
  display the first control screen when the touch input is a first touch input starting in a first position at said one end of the mobile terminal and moving in a first direction from said one end toward the other end of the mobile terminal, and
  display the second control screen when the touch input is a second touch input starting in a second position at said one end of the mobile terminal and moving in the first direction from said one end toward the other end of the mobile terminal.

3. The mobile terminal of claim 1, wherein the control screen is displayed at a position on the touch screen depending on the point to which the touch input is applied.

4. The mobile terminal of claim 1, wherein the touch screen includes first and second areas, and
  wherein the controller is further configured to display the control screen and the execution screen in the first and second areas, respectively.

5. The mobile terminal of claim 4, wherein the point to which the touch input is applied is in the first area.

6. The mobile terminal of claim 4, wherein the controller is further configured to resize contents included in the control screen based on a size of the first area.

7. The mobile terminal of claim 1, wherein the execution screen includes a first execution screen and a second execution screen, and
  wherein the controller is further configured to display any one of the first and second execution screen positioned in the direction of the user's sight line with the control screen.

8. The mobile terminal of claim 1, wherein the execution screen includes a first execution screen and a second execution screen, and
  wherein the controller is further configured to highlight any one of the first and second execution screens positioned in the direction of the user's sight line.

9. The mobile terminal of claim 1, wherein the first control screen includes a control menu for controlling components disposed in a main body of the mobile terminal, and the second control screen includes a control menu for controlling the execution screen.

10. The mobile terminal of claim 1, wherein the controller is further configured to output guidance information related to the first and second control screens when the touch input is received.

11. A method of controlling a mobile terminal, the method comprising:
  displaying, via a touch screen of the mobile terminal, an execution screen;
  receiving, via a controller of the mobile terminal, a touch input to one end of the touch screen that continuously moves in a direction toward the other end of the touch screen;
  tracking, via a camera disposed in a front of a main body of the mobile terminal, a direction of a user's sight line using an image captured in the camera; and
  displaying a control screen on the touch screen among any one of first and second control screens based on a point to which the touch input is applied, wherein a display position of the control screen is varied according to the tracked direction of the user's sight line.

12. The method of claim 11, further comprising:
  displaying the first control screen when the touch input is a first touch input starting in a first position at said one end of the mobile terminal and moving in a first direction from said one end toward the other end of the mobile terminal; and
  displaying the second control screen when the touch input is a second touch input starting in a second position at said one end of the mobile terminal and moving in the first direction from said one end toward the other end of the mobile terminal.

13. The method of claim 11, wherein the control screen is displayed at a position on the touch screen depending on the point to which the touch input is applied.

14. The method of claim 11, wherein the touch screen includes first and second areas, and
  wherein the method further comprises displaying the control screen and the execution screen in the first and second areas, respectively.

15. The method of claim 14, wherein the point to which the touch input is applied is in the first area.

16. The method of claim 14, further comprising resizing contents included in the control screen based on a size of the first area.

17. The method of claim 11, wherein the execution screen includes a first execution screen and a second execution screen, and
  wherein the method further comprises displaying any one of the first and second execution screen positioned in the direction of the user's sight line with the control screen.

18. The method of claim 11, wherein the execution screen includes a first execution screen and a second execution screen, and
  wherein the method further comprises highlighting any one of the first and second execution screens positioned in the direction of the user's sight line.

* * * * *